May 26, 1959 M. E. BOBO ET AL 2,887,789
EDUCATIONAL GAME BOARD
Filed Dec. 12, 1955 2 Sheets-Sheet 1

INVENTORS
Waldo S. Miller
Mildred E. Bobo
BY Whitehead, Vogl & Lowe

Frank C. Lowe

ATTORNEYS

May 26, 1959 M. E. BOBO ET AL 2,887,789
EDUCATIONAL GAME BOARD
Filed Dec. 12, 1955 2 Sheets-Sheet 2

INVENTORS
Waldo S. Miller
BY Mildred E. Bobo
Whitehead, Vogl & Lowe
PER. Frank C. Lowe
ATTORNEYS

United States Patent Office

2,887,789
Patented May 26, 1959

2,887,789
EDUCATIONAL GAME BOARD
Mildred E. Bobo, Jefferson County, and
Waldo S. Miller, Denver, Colo.
Application December 12, 1955, Serial No. 552,560
4 Claims. (Cl. 35—9)

This invention relates to educational devices and game toys of that class which involves the recognition and association of various concepts, and more particularly to an improved educational game device which involves the recognition and association of numerical relationships, word-object designations, and the like, and the invention is a development from an improvement over our prior invention which has issued as Patent Number 2,491,084, on December 13, 1949.

An object of the invention is to provide an improved educational game device of the class disclosed in our prior patent which is adapted to permit a single device to be used with many different types of associative relationships, as where for example, information concerning selected relationships may be provided separately from the game board itself as a supplement to the board.

Another object of the invention is to provide an associative educational game primarily for grade school children whereby a member carrying a mathematical problem or picture of an object can be manually fitted to a base carrying the answer or name of the object only at a selected location on the base, whereby when an individual playing the game or knowing the word-object relationship can visually locate the answer and then put said member into proper engagement with the base to designate the proper answer, and when played competitively the player who most readily knows the answers will most quickly get his members placed in the proper position on the base.

Yet another object of the invention is to provide a novel and improved associative educational game which involves the organization and proper correlation of a plurality of analogous relationships, such as mathematical problems or word-object relations, onto a base with the individual correlative relationships partially on the base and partially on members attachable to the base at selected, properly designated locations not easy to ascertain without knowledge of the relationships.

Still other objects of the invention are to provide such novel and improved associative educational game which is a simple, compact unit with several types of games incorporated into a single unit and which is a neat appearing, simply constructed low cost unit.

With the foregoing and other objects in view, all of which more fully hereinafter appear, our invention comprises certain novel and improved constructions, combinations and arrangements of parts and elements, as hereinafter described and as defined in the appended claims and illustrated in preferred embodiment in the accompanying drawing, in which:

Figure 1:
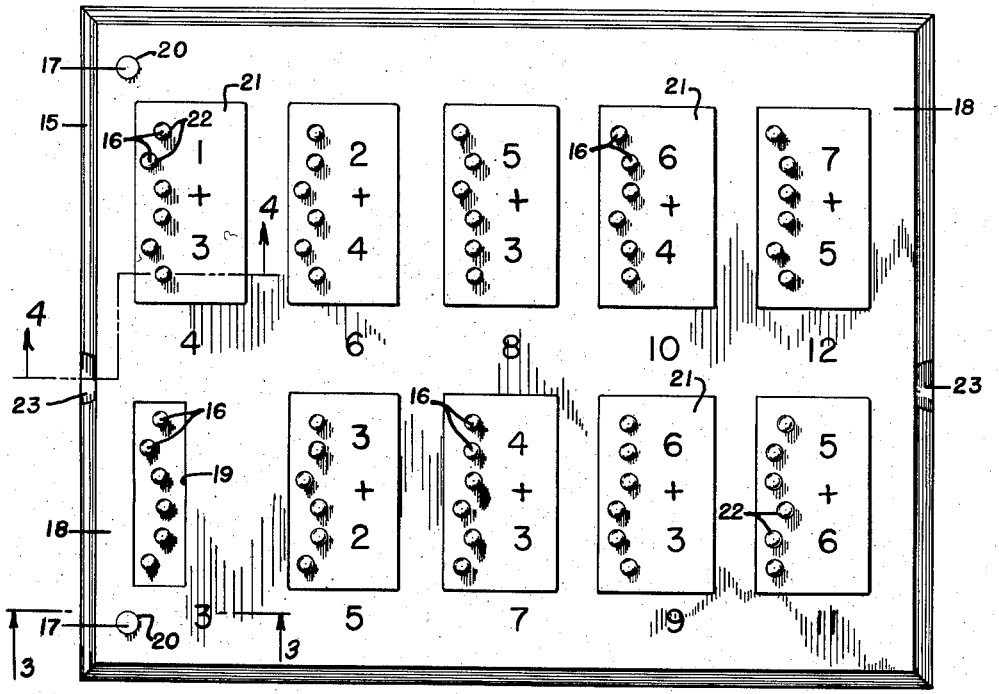
Figure 1 is a plan view of the educational board with groups of indicia cards properly set thereon to illustrate relationships of numbers as in mathematical problems, and with one group of cards being omitted therefrom to show constructions thereunder.
Figure 2:
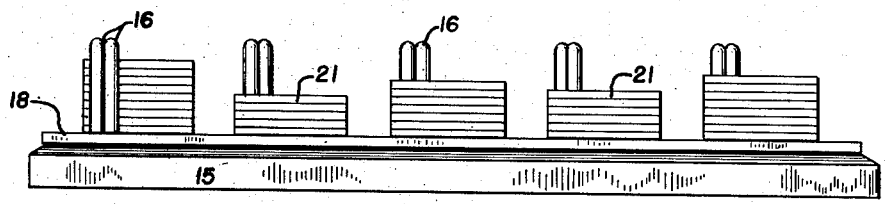
Figure 2 is a front or edge elevation view of the construction as illustrated at Fig. 1.
Figure 3:
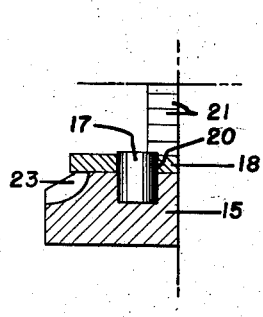
Figure 3 is a fragmentary sectional detail as viewed from the indicated line 3—3 at Fig. 1 but on an enlarged scale.
Figure 4:
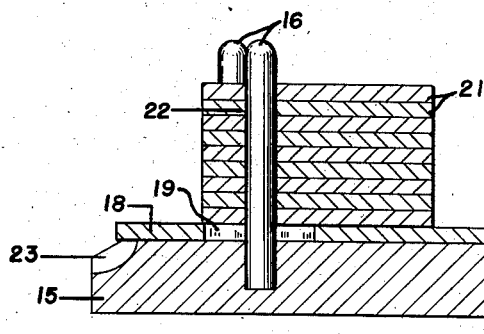
Figure 4 is a fragmentary sectional detail as viewed from the indicated line 4—4 at Fig. 1 but on an enlarged scale.

Referring more particularly to the drawing, the educational game board includes a rectangular base 15 of suitable rigid material which may be a wooden board or sheet or the like to provide a base for all other elements. This board is subdivided into a plurality of regular sections or stations, which are defined in part by groups of upstanding pegs 16 along the edge of each section. Such pegs, or equivalent means are arranged substantially along a given line at all stations but the individual pegs in each individual group are offset from the alignment selected amounts in an irregular order so that each group of pegs provides for an individual irregular pattern different from the pattern of other groups. The offsetting is shown in the drawing in a manner which is easily discernible to provide a clear disclosure. However, it is contemplated that such offsetting may be so slight as to make it difficult for a person to easily ascertain the different offset patterns. This board also includes short pins 17 at the corners to provide for properly setting pads thereon as hereinafter described.

A rectangular reference pad 18 of substantially rigid thin cardboard like material is formed to be substantially the same size as base 15, a slot 19 is cut in this pad 18 at the edge of each station at each group of pegs 16 to receive the pegs when the pad is set upon the base 15 and orifice 20 is positioned in each corner of the pad for registration with and reception of each pin 17 when the pad is properly positioned upon the base.

A plurality of rectangular cards 21 are cut of substantially rigid cardboard like material with each card being of proper size to substantially cover a section or station on the base, and each card 21 includes a plurality of orifices 22 along one edge which are formed in an irregular order to provide registration with a selected group of pegs at a selected section and thereby a given card is associated with a designated section for ascertaining a relationship between the card and the reference pad indicia at such selected station.

Figure 5:
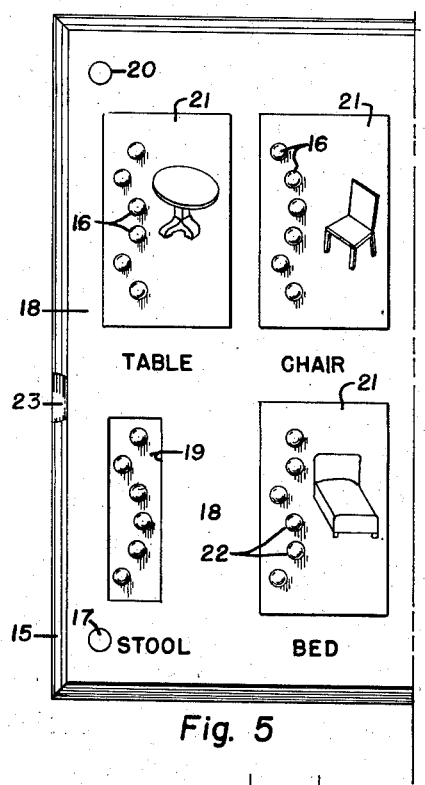
Figure 5 is a portion of the educational board illustrated at Fig. 1 but with different reference symbols and different groups of indicia cards properly set thereon to illustrate the use of the game to show word-object designations and with one group of cards being omitted therefrom to show constructions thereunder.
Figure 6:
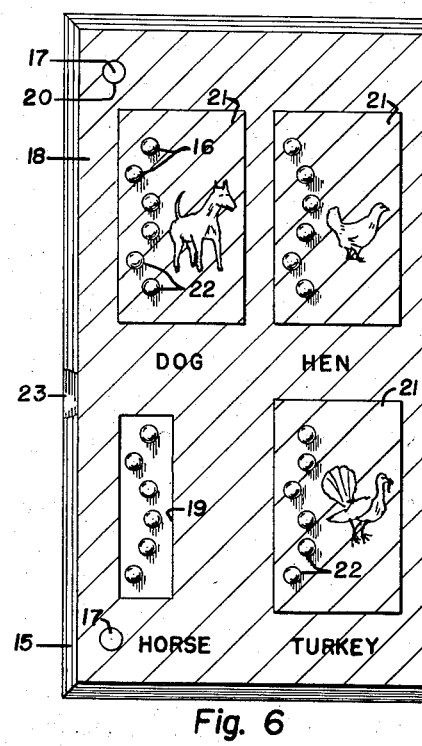
Figure 6 is similar to Fig. 5 but illustrates the elements showing the reference symbols as being reversed to provide another class of word-object designations.

The cards 21 and reference pad are printed with various indicia which may be numeral relationships as indicated at Fig. 1, or word-object relationships as indicated at Fig. 5 and Fig. 6. Each card may have a group of numbers which may be added or multiplied or otherwise operated upon, the illustration showing simple additions, and the answers printed upon the reference pad 18 below the position of the cards, as clearly illustrated at Fig. 1. Several cards may be used for each station to provide several different combinations of additions or subtractions which give the same answer shown in the reference pad at that station. Likewise, selected objects may be printed upon the cards 21 and the names of the objects printed upon the reference pad 18 below the proper position of the cards, as clearly illustrated at Fig. 5 or selected pictures of animals may be printed upon the cards and the names of the animals printed upon the reference pad 18 below the position of the cards as illustrated. Several cards may be used for each station, for example, these may be several types of cards showing tables which fit at the properly designated station at the illustration of Fig. 5. It follows that the cards of a given group of objects may be shuffled and then a player can study them and place each card upon its proper set of pegs 16 to position the card over the proper answer or proper name. Such a game will facilitate the teaching of young students in a manner which makes an interesting game for the children.

The use of the reference pad 18 which is separable from the base permits a single base to be used with several sets of pads and cards by simply removing a pad from the base and replacing it with another. Finger notches 23 are formed in opposing edges of the base 15 to facilitate such removal.

Each reference pad and the cards used therewith may be distinguished from the other by a selected color or texture or the like, and it is within the contemplation of the invention that a single pad be printed on both sides and that the peg groups be arranged in horizontal and vertical rows in such a manner as to provide an axial symmetry of the unit which permits the reference pad 18 to be turned over and the slots 19 will then fit opposing groups of pegs 16 and the orifices 20 will fit upon opposing pins 17. Referring more particularly to Figs. 5 and 6, the pad 18 may illustrate inanimate objects on one side, such as a table, chair stool and bed, Fig. 5, while it may illustrate animals such as a dog, hen, horse, and turkey on the other side, Fig. 6, and this opposite side may be colored differently in order to distinguish it from the other.

Figures 7, 8:
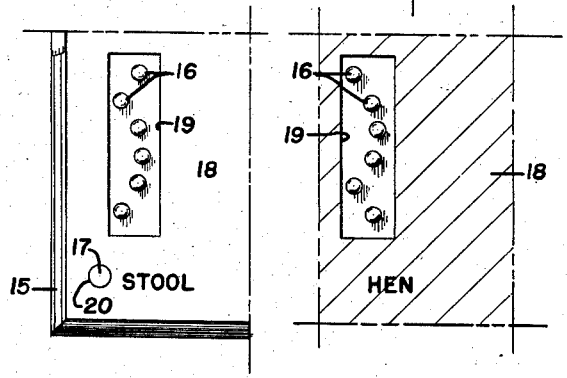
Figure 7 is a fragmentary portion of the arrangement illustrated at Fig. 5.
Figure 8 is a fragmentary portion of the arrangement illustrated at Fig. 6, but with indicia card removed.
Figures 9, 11:
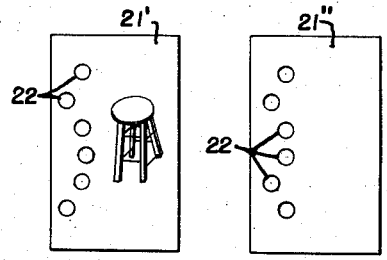
Figure 9 is a view of one side of an indicia card adapted to be associated with the portion illustrated at Fig. 7.
Figure 11 is a view of an indicia card adapted to be positioned on a board at a selected station with either side turned up.
Figure 10:
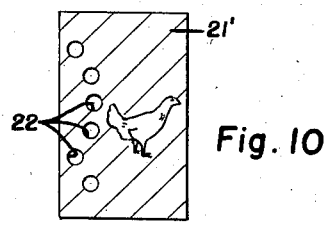
Figure 10 is a view of the card illustrated at Fig. 9, but being turned over and adapted for association with the portion illustrated at Fig. 8.

The cards 21 may likewise be printed on both sides, and cards 21 used for the illustrations at Fig. 6, may be the opposite side of the cards illustrated at Fig. 5. However, such inversion of the cards is not possible without an inverted relationship between the offset pattern of selected pairs of peg groups. Figs. 9 and 10 illustrate the two sides of a selected card 21' and illustrate the opposing patterns of the orifices 22 as when the card is turned over. With the card in one position, as illustrating a stool, Fig. 9, it is adapted to set upon one group of pegs 16, as as Fig. 7. There must be another group of pegs which are offset in the opposite manner as the offset pattern of the group illustrated at Fig. 7 and such group is illustrated at Fig. 8, which may be at any other location on the board, and the card 21' is adapted to be set upon this group when it is turned over to illustrate, for example, a hen.

Figure 11 illustrates yet another mode of forming the peg and orifice 22 arrangement where a card 21'' is formed with a symmetrically offset pattern of orifices 22 whereby the same hole arrangement appears with either side of the card turned up.

There are obviously various ways of playing a game when a given group of relations are set up, one of which will be described for illustration. Suppose two players, each having a complete unit including a base 15, pad 19 thereon and set of cards 21, are competing. At a given signal each player begins to place his cards at the sections below which is the answer to the problem carried by the card 21 he is playing. The player first placing all of his cards properly wins the game. The player who can mentally get the answers or form the proper word-picture associations can properly place cards more rapidly than can the player who has to manipulate the members manually in an effort to find the proper peg arrangement corresponding to the arrangement of orifices in the card he is playing. However, he who must fumble will quickly learn the proper picture or word relationships or answers to problems and thereby the game serves its educational purpose.

While we have illustrated and described various details of construction, many alternative and equivalent structures will occur to those skilled in the art and which are within the scope and spirit of our invention and our protection should be limited, not by the constructions illustrated and described, but only by the proper scope of the appended claims.

We claim:

1. A game device comprising, in combination, a plurality of card-like members each card having characters printed on each side thereof constituting a problem and having an orifice arrangement along an edge constituting interengaging means, a reference pad having a plurality of sections provided thereon, each section being defined by a slot along one side thereof and by an answer printed along another side thereof and printed on both sides of the pad, a base adapted to carry the pad at a selected position thereon, peg arrangements upstanding from said base at positions corresponding with said pad sections and being adapted to upstand through said slots with the pad upon the base, the cards being adapted to set upon the pad at selected sections with the orifice arrangement being threaded over the peg arrangements, each peg arrangement being differently patterned from the other peg arrangements at other sections and being thereby adapted to co-mate only with selected card-orifice arrangements, said selected cards having problems thereon which correspond with the answer printed at said selected section each pad being symmetrically formed with respect to the slots and being thereby adapted to be mounted upon the base with either side up and each peg arrangement being the invrese pattern of another peg arrangement whereby the cards may be placed upon one arrangement with one side up and upon another arrangement with the other side up.

2. A game device, comprising, in combination, a plurality of card-like members having characters printed on each side of each card constituting problems, a reference pad having a plurality of sections provided thereon and having slots at the sections and answers to said card problems printed at the sections alongside the slots, a base adapted to receive said reference pad, interengaging means upstanding from said base and adapted to extend through the slots of said reference pad and mating interengaging means on each card, said means being so arranged that only those members carrying problems whose answer is the same, can be interengaged with the means adjacent such answer on the pad, the interengaging means at one section being of an inverted irregular pattern of the interengaging means at another section whereby a selected card will fit at one section with one side up and will fit at the other section with the other side up.

3. In the game device defined in claim 2, said sections being arranged in a symmetrical pattern whereby said reference pad will fit upon the base with either side up.

4. In the game device defined in claim 2, said sections being arranged in a symmetrical pattern whereby said reference pad will fit upon the base with either side up, said pad having one surface visibly distinctive from the other surface and said members having visibly distinctive surfaces corresponding with the surfaces of the pad whereby one set of problems may be printed on one surface of the members, another set of problems printed on the other surface and answers printed on each side of the pad correlating with the corresponding distinctive surfaces of the pad and members.

References Cited in the file of this patent

UNITED STATES PATENTS

| | | |
|---|---|---|
| 1,696,988 | Troidl | Jan. 1, 1929 |
| 2,491,084 | Bobo et al. | Dec. 13, 1949 |
| 2,505,230 | Composto | Apr. 25, 1950 |
| 2,645,041 | Merrill | July 14, 1953 |
| 2,701,423 | Merrill | Feb. 8, 1955 |